United States Patent [19]

Hestich

[11] 4,374,475
[45] Feb. 22, 1983

[54] DIFFERENTIAL PRESSURE GAUGE

[75] Inventor: John Hestich, Glendora, Calif.

[73] Assignee: Dwyer Instruments, Inc., Michigan City, Ind.

[21] Appl. No.: 232,988

[22] Filed: Feb. 9, 1981

[51] Int. Cl.³ ............................................. G01L 7/04
[52] U.S. Cl. ........................................ 73/736; 73/742
[58] Field of Search ............... 73/742, 743, 740, 741, 73/732, 736, 737, 738, 739, DIG. 5; 116/267

[56] References Cited

U.S. PATENT DOCUMENTS

| 2,929,249 | 6/1960 | Lindsay | 73/418 |
|---|---|---|---|
| 3,180,152 | 4/1965 | Metzger et al. | 73/384 |
| 3,338,101 | 8/1967 | Krasnitz et al. | 73/411 |
| 3,645,140 | 2/1972 | Phillips et al. | 73/407 R |
| 3,789,668 | 2/1974 | Bissell | 73/418 |
| 3,807,232 | 4/1974 | Wetterhorn | 73/418 |
| 4,011,759 | 3/1977 | Phillips et al. | 73/407 R |
| 4,030,365 | 6/1977 | Phillips et al. | 73/393 |
| 4,043,197 | 8/1977 | Mounteer et al. | 73/742 |
| 5,142,256 | 2/1894 | Bristol et al. | |

Primary Examiner—Donald O. Woodiel
Attorney, Agent, or Firm—McWilliams, Mann & Zummer

[57] ABSTRACT

A differential pressure gauge of the type comprising a controlling magnetic helix device carrying a pressure indicating pointer, the position of which is controlled by a magnet magnetically coupled to same and mounted on the free end of a helically coiled bourdon tube exposed to differential pressures within the gauge and anchored in the gauge housing at its other end for this purpose. The magnet has a planar pole face paralleling the axis of the helix and defines a magnetic axis that is normal to and intersects the helix axis. The gauge housing defines an integral one piece pressure wall that separates and physically seals the helix from the magnet and bourdon tube and defines within the gauge housing pressure cavity an operating space within which the magnet and its supporting bourdon tube are mounted and operate. Between the helix and the magnet the pressure wall is of film dimensions to allow close placement of the magnet and helix relative to each other, and for defining a magnetic flux passing "window"; the pressure wall is contoured to stress in bending. The bourdon tube is mounted on a mounting plate or crossmember disposed within the pressure cavity, and the mounting plate is arranged for calibrating the gauge by adjustment of the mounting plate, the bourdon tube it carries, and the magnet, as a unit, toward and away from the helix. The gauge includes a zero datum and a device for setting the indicating pointer on the zero datum from exteriorly of the gauge, including an adjustment mechanism coupled to the helix and seated on the housing in alignment with the helix axis.

20 Claims, 11 Drawing Figures

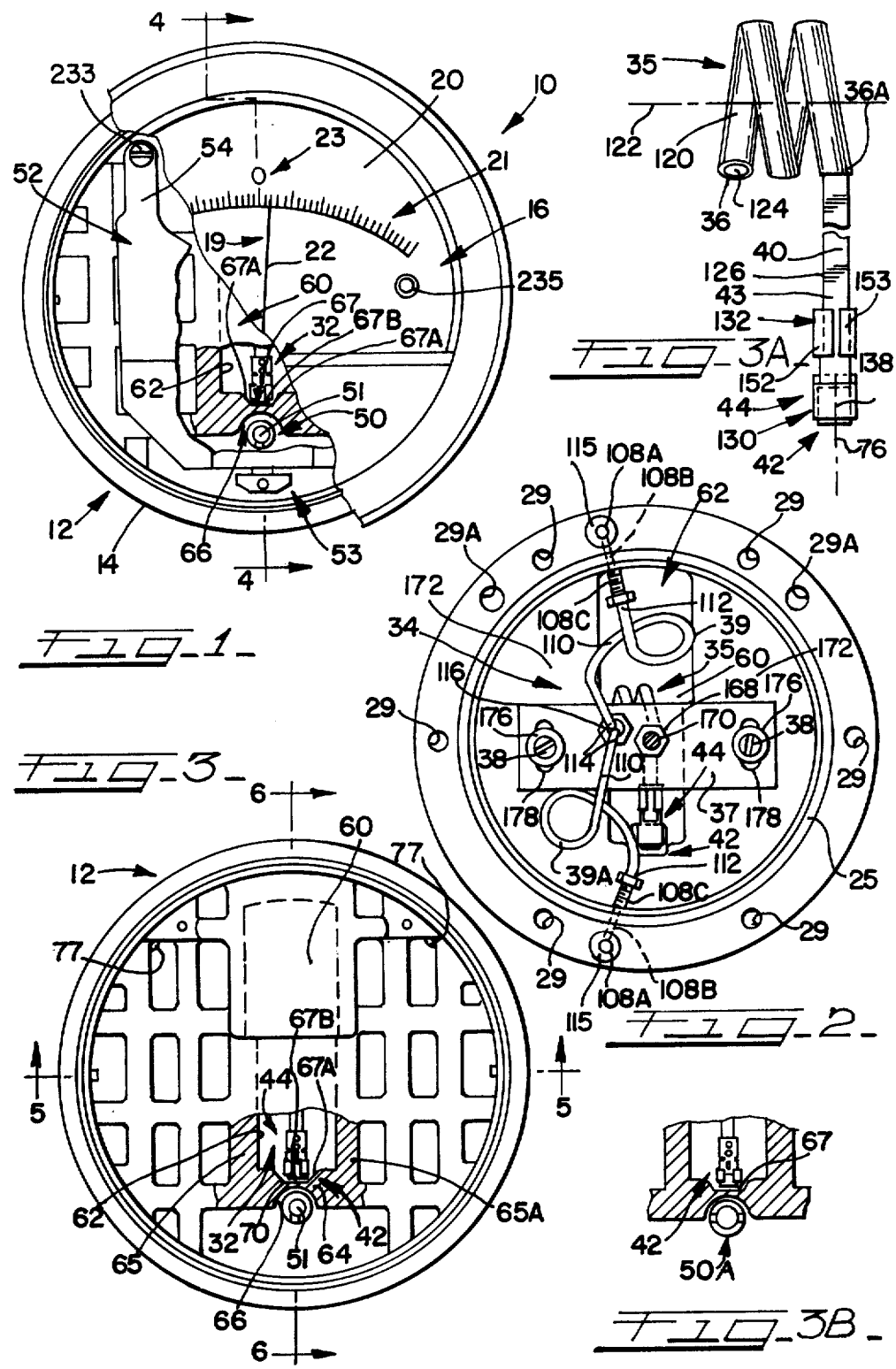

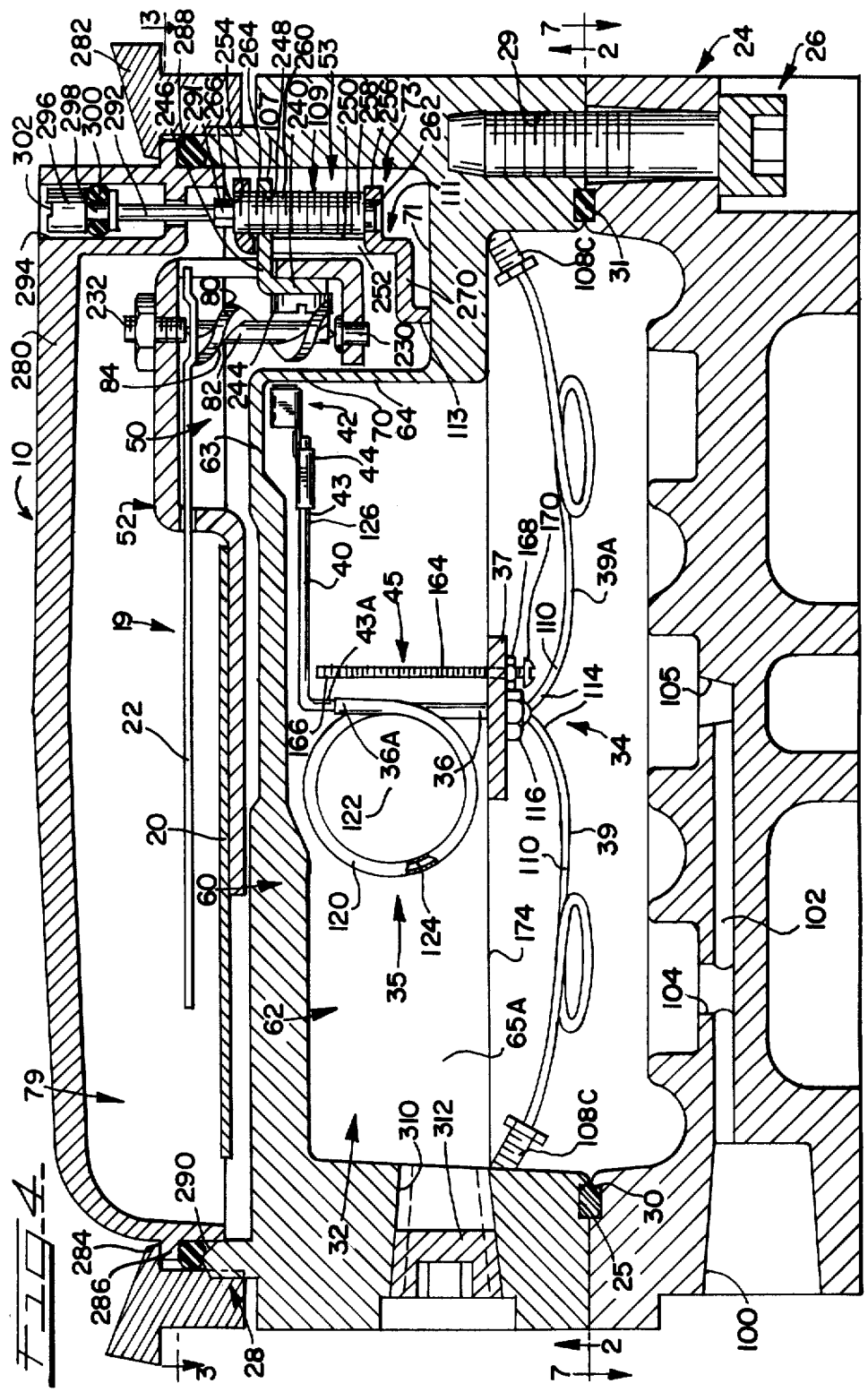

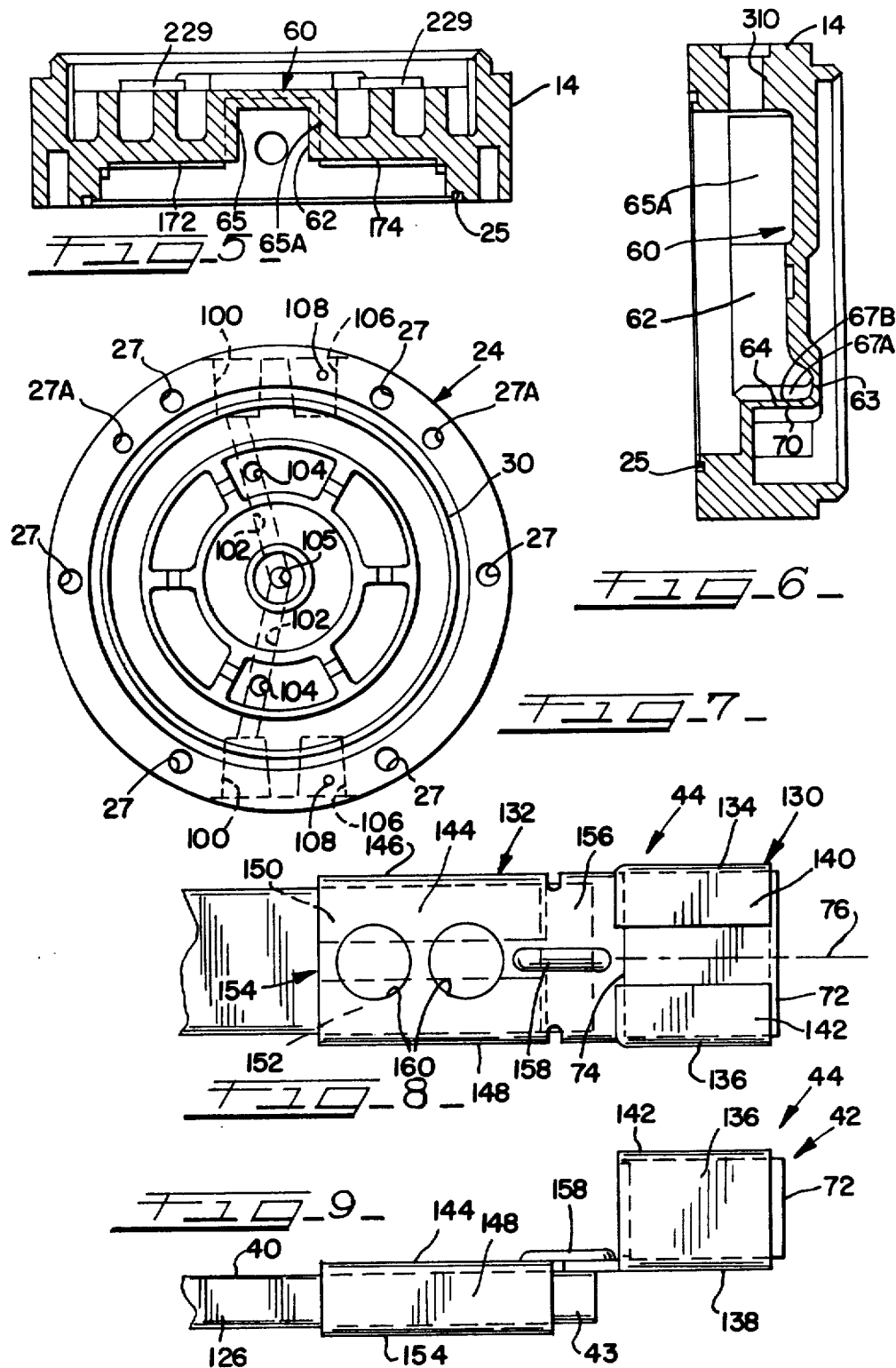

DIFFERENTIAL PRESSURE GAUGE

This invention relates to pressure gauges, and more particularly to sealed capsule type differential pressure gauges of the general type shown in Phillips and Zoludow U.S. Pat. No. 3,645,140, and Phillips and Troyer U.S. Pat. Nos. 4,011,759 and 4,030,365, that include a flexible diaphragm that is to be exposed to differential pressures to operate a sensitive and accurate motion transmitting indicator device mounted in the capsule.

In the arrangement of these patents, the motion transmitting device is in the form of a pivotally mounted helix cooperating with the magnet to indicate differential pressures and changes therein by movement of the magnet through a linkage connection to the diaphragm. These patents show several ways to mount the helix to achieve this end, and disclose a range spring mounting arrangement for the magnet that includes an adjustable fulcrum, and a wishbone mounting arrangement for the helix accommodating zero setting of the helix mounted indicator arm. A similar arrangement is shown in Phillips and Zoludow U.S. Pat. No. 3,862,416 relating to a pressure indicator and switch arrangement. The disclosures of these patents are incorporated herein by this reference.

The helix conventionally employed in motion transmitting devices of the type indicated generally involve a spindle defining one or more helically contoured flanges or lobes along the side of the spindle, cooperating either with a horseshoe magnet that embraces the helix, or a plate type magnet that may have a flux concentrating plate disposed to cooperate with one of the helix edges. As the mass of the helix and the orientation of the magnetic lines of force acting on same are critical aspects of the sensitivity of the device, it is important that these components have such aspects arranged to maximum benefit for improving the sensitivity of the device.

In devices of the general type under consideration, it is desirable to avoid having the helix and its indicating pointer operate subject to the higher of the differential pressures to which the gauge may be exposed, and thus the helix and operating magnet therefore are sometimes mounted in the low pressure chamber of the gauge, for instance, as shown in said U.S. Pat. No. 3,645,140. However, where the gauge is to be used in total pressure (applied to the gauge) ranges from 100 to 1,500 psig. or more, both pressure sides of the gauge will be under relatively high pressures, requiring special mounting of the helix to keep it in an operating pressure environment that will insure maximum sensitivity and accuracy.

One way of isolating the helix from the gauge high pressure is to mount it in a separate tubular housing that forms a well within the gauge pressure chamber, within which the helix operates but free of the pressure chamber pressures. One such arrangement is shown in Neyer U.S. Pat. No. 3,373,614. However, arrangements of this type involve a separate mounting for the tubular housing that forms the well, as well as journaling of the helix inside the housing, which necessarily involves extra parts and machining and assembly operations that are preferably avoided. In addition, it is not possible to bring the magnet in close adjacency to the helix, in such an arrangement, due to the strength required of the tubular housing, and thus its wall thickness requirements.

Of course, the range and zero adjustments in devices of this type are critical for acceptable accuracy. A troublesome problem for gauges of this type designed for the high pressure range use is that the adjustment mechanisms involved can be adversely affected due to structural deflections caused by stresses generated in the gauge housing under such pressures.

More fundamentally, diaphragm type pressure differential sensing arrangements have limitations in the pressure differentials that can be sensed, due to the practical difficulties in minimizing the effective area of the diaphragm, and making the magnet mounting leaf spring and linkage connecting same to the diaphragm strong enough to handle the higher differential pressure ranges. While it is common to have to limit pressure differentials acting on the diaphragm to about the twenty to twenty-five psi range, there are increasing applications for gauges of this type where the pressure differential may be on the order of thirty psi to two hundred psi or more.

A principal object of this invention is to provide a pressure gauge for gases and liquids of the general type indicated in which, for pressure differential sensing purposes, the sensing mechanism takes the form of a special bourdon tube arrangement of the helically coiled type which replaces the diaphragm, leaf spring, the linkage connecting same, and the leaf spring rate adjust and lock therefor, and that operates in the pressure cavity of the gauge to present the magnet in magnetic coupling relation to the helix and pivot the helix for pressure differential indicating purposes, which differential pressures may be up to two hundred or more psi.

A further principal object of the invention is to provide a differential pressure gauge of the general type indicated in which a bourdon tube pressure differential sensing assembly replaces diaphragm-leaf spring type sensing assemblies, with the magnet becoming part of the bourdon tube assembly, and the latter being arranged for adjustment movement as a unit, toward and away from the helix, for gauge calibration purposes.

Another important object of the present invention is to maintain the sensitive relationships of the helix, magnet, and the zero set mechanisms of the gauges referred to, while arranging the gauge to accommodate pressure differentials on the order of up to two hundred psi or more.

Yet another principal object of the invention is to provide a differential pressure gauge especially suited for higher total pressure use, in which the helix and dial indicator operate outside of the gauge pressure cavity, and in a vented space of the gauge, without requiring the conventional "well" construction.

Another important object of the invention is to provide a differential pressure gauge arrangement for higher total pressure use (for both gases and liquids) of improved sensitivity and involving an arrangement of the gauge housing which accommodates disposing the helix exteriorly of the gauge pressure cavity and under vented ambient conditions without requiring separate components or special machining for that purpose, which permits the use of the wishbone type mounting of the helix that is shown, for instance, in said U.S. Pat. Nos. 3,645,140, 3,862,416, 4,011,759, and 4,030,365, and which permits single pressure gauge use of the same instrument.

Still other objects of the invention are to provide an improved magnetically coupled motion transmitting arrangement for differential pressure gauges, to provide a bourdon tube type pressure differential sensing assembly and a mounting arrangement therefor that permits ready calibration of the gauge by adjusting the assembly as a whole with respect to the helix, to provide a differential pressure gauge arrangement for use under pressures of up to 1,500 psig., and to provide a differential pressure gauge that is economical of manufacture, convenient to install and use, and long lived in operation.

In accordance with the invention, a differential pressure gauge is provided for both differential and single pressure use (and for both gases and liquids) comprising a housing arranged to mount the helix on a wishbone for cooperation with a bourdon tube mounted magnet, in which the helix is characterized by having a single or double helically contoured side edge disposed for cooperation with the magnet, the latter being in the form of a parallelepiped shaped body presenting a planar pole face disposed in a plane paralleling the pivotal axis of the helix and having a magnetic axis that extends normally of its said pole face, with the magnet being oriented so that its magnetic axis intersects the pivotal axis of the helix at right angles thereto, and the helix pivot axis and the magnet magnetic axis lie in a common plane in which the magnet is to be moved linearly, parallelly of the helix pivot axis, to pivot the helix to reflect differential pressures sensed by the gauge.

The gauge housing is formed with an integral pressure wall that in part defines the pressure cavity of the housing and separates the magnet from the helix. The magnet and helix are disposed closely adjacent to each other with the portion of the pressure wall separating same defining oppositely disposed flat and concave surfaces between which the pressure wall is of film dimensions to define a closed or imperforate pressure resisting magnetic flux passing "window" through which the magnetic flux acts on the helix, and which is flat or planar on the magnet side of same. The pressure wall in question is formed to define a pressure chamber portion within the housing pressure cavity that receives the bourdon tube and magnet and accommodates the movement they are to have for helix movement inducing purposes. The housing pressure cavity is defined by the housing and its base or back plate when secured together, which cavity forms the gauge pressure chamber in which the bourdon tube is mounted.

The bourdon tube is incorporated in a bourdon type pressure differential sensing assembly that includes an adjustably mounted cross member to which one end of the bourdon tube is anchored, which bourdon tube end is placed in communication with the fluid high pressure source. The bourdon tube is of the helically coiled type, in which the tube is partially flattened, and the coiled tube is disposed such that the other end of same is substantially aligned with the aforementioned magnetic axis-helix axis common plane; such other end of the bourdon tube is sealed closed and mounts a rectilinear support arm cantilever fashion that lies in said common plane and that projects toward the helix and adjustably mounts the magnet on same at its free end. The adjustable mounting of the bourdon tube assembly cross member permits the bourdon tube assembly to be shifted rectilinearly toward and away from the helix, in parallelism with said common plane, to calibrate the gauge. The gauge housing is arranged for connection of its pressure cavity to the low pressure source, for differential pressure gauge use, or venting to atmosphere for single pressure gauge use.

With connection of the gauge pressure cavity to a low pressure source and connection of the bourdon tube to the high pressure source, the tube deflects, in proportion to the pressure differential, in a rotational manner to shift the magnet longitudinally of the helix axis in said common plane. The bourdon tube wall thickness, flattened dimensions, coil size, and number of coil turns may be varied to provide a desired tube free arm rotational deflection for given applied pressure differentials. The tube free end arc movement for full scale indication from the helix and its indicating pointer may be relatively small, for instance, in the range of from about five to about seven degrees, which contributes to long gauge useful life. Connection of the gauge pressure cavity for venting purposes provides single pressure gauge use in which the high pressure source is similarly measured against atmospheric pressure.

Other objects, uses, and advantages will be obvious or become apparent from a consideration of the following detailed description and the application drawings.

In the drawings:

FIG. 1 is a top plan view of one embodiment of the invention, with parts broken away to expose other parts, including the helix, the magnet, and the gauge pressure wall, the latter being shown in section;

FIG. 2 is a bottom plan view of the gauge housing member, taken along line 2—2 of FIG. 4, showing the bourdon tube assembly applied thereto;

FIG. 3 is a plan view of the top side of the gauge housing member, looking in the direction of the arrows of line 3—3 of FIG. 4, with the housing cover, the indicator scale and helix pointer arm, and the wishbone and other associated parts omitted, but showing the magnet and helix disposed in their operating positions in a diagrammatic manner, with the pressure wall being shown in section;

FIG. 3A is a diagrammatic plan view of the bourdon tube, magnet support arm carried thereby, and magnet, viewed as seen in FIG. 2, but on an enlarged scale;

FIG. 3B is a fragmental view corresponding to that of FIG. 3, but showing an alternate form of helix;

FIG. 4 is a transverse cross-sectional view taken substantially along line 4—4 of FIG. 1, but on an enlarged scale;

FIG. 5 is a sectional view of the gauge housing member per se taken substantially along line 5—5 of FIG. 3;

FIG. 6 is similar to FIG. 5 but taken substantially along line 6—6 of FIG. 3;

FIG. 7 is a plan view of the top or inner side of the base plate, taken along line 7—7 of FIG. 4, and viewed as it would be oriented to the gauge housing member as the gauge is viewed in FIG. 1;

FIG. 8 is a fragmental top plan view of the magnet as applied to its mounting bracket that is in turn mounted on the bourdon tube mounted support arm, on an enlarged scale; and FIG. 9 is a side elevational view of the magnet and associated parts that are shown in FIG. 8.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL DESCRIPTION

Reference numeral 10 of FIGS. 1 and 4 generally indicates a pressure gauge arranged in accordance with the invention, adapted for both differential and single pressure use, comprising a housing 12 including a housing member 14 that has applied to the front or upper side of same a cover 16 through which is visible the dial plate 20 of the gauge with which the gauge pointer 19, in the form of arm 22, cooperates. Dial plate 20 has suitable indicia 21 on same for reading the gauge, including the zero datum mark, diagrammatically illustrated at 23 in FIG. 1 (which, of course, can be located as desired relative to indicia 21, depending on the application).

On the back side of the housing member 14 is a base or back plate 24 that is part of housing 12. The housing member 14 and base plate 24 are in the form of separate castings shaped in the manner indicated in the drawings and adapted for securement together by employing suitable screws 26 received through openings 27 formed in the base plate and threaded into correspondingly located threaded openings 29 of the housing member. The cover 16 is threadedly secured in place where indicated at 28 in FIG. 4.

The gauge housing member 14 and base or back plate 24 are generally similar to the corresponding parts shown in U.S. Pat. No. 4,030,365; the housing member 14 and the base plate 24 are shaped to define a pressure cavity 32, with the housing member 14 and base plate 24 being suitably formed to connect the pressure cavity 32 to the sources of differential pressures to be measured by the gauge 10. Housing member 14 and base plate 24 are respectively formed with the respective annular recesses 25 and 30 that receive suitable O-ring seal 31 in sealing relation thereto in the assembled relation of these parts.

Mounted in pressure cavity 32 is a bourdon tube type sensing assembly 34 comprising a helically coiled bourdon tube 35 anchored at one end 36 to mounting plate member 37 that is secured to the housing member 14 by screws 38. Tube 35 at its said end 36 is connected to the gauge passages that are to be connected to the high pressure source, as by employing suitable conduits 39 and 39A, and at its free end 36A tube 35 is sealed closed and has affixed to same cantilever fashion the rectilinear support arm 40 that at its free end 43 adjustably carries magnet 42 by way of mounting bracket 44. Assembly 34 also includes adjustable over pressure stop 45 that is carried by plate member 37 and is aligned with the magnet support arm 40. The pressure cavity is suitably connected to the low pressure source, for pressure differential gauge use, so that variations in pressure of the high and lower pressure sources will result in radial expansion and contraction of tube 35 about the axis 122 it is coiled about that results in such arcuate deflection of its free end 36A that will effect movement of the magnet 42 it supports through arm 40 vertically of FIG. 4. For single pressure gauge use, cavity 32 is vented to atmosphere, with tube 35 functioning in a similar manner to effect movement of magnet 42.

Gauge 10 also includes helix 50 journaled for rotation about its longitudinal axis 51 in support frame 52 that forms the so-called wishbone similar to the corresponding arrangements of U.S. Pat. Nos. 3,862,416 and 4,030,365, which support frame 52 is cantilever mounted at its leg portions 54 (see FIG. 1 where only one is shown) to support the helix 50 for movement vertically of FIG. 4 relative to the housing member 14. Helix 50 may be of either the single or double type, as disclosed in U.S. Pat. Nos. 4,011,759 and 4,030,365.

The pointer arm 22 is suitably fixed to the helix 50 so that when the helix 50 rotates about its longitudinal axis 51, the position of the pointer 22 will change relative to the gauge plate 20 to give a differential pressure reading on the scale indicia there indicated (see FIG. 1). The helix 50 moves in this manner on movement of the magnet 42 upwardly or downwardly of FIG. 4 under the action of differential pressures in the bourdon tube 35 and pressure cavity 32, or on movement of the support frame 52 relative to the housing member 14 by operation of the zero adjust device 53, which is used to set the pointer 22 on the dial zero datum mark 23.

In accordance with the invention, the housing member 14 is formed to define a pressure wall 60 which in part defines the pressure cavity 32. More specifically, the pressure wall 60 is shaped to define an elongate chamber portion or recess 62 in which the bourdon tube 35, its support arm 40, and magnet 42 are disposed when mounted in their operative positions. Wall 60 transversely of the chamber portion or recess 62 is of generally U-shaped configuration (see FIG. 5), thus defining side portions 65 and 65A and adjacent the location of the helix 50, it is indented, on the pressure side of same, as at 63, to accommodate the magnet 42.

Adjacent the indentation 63 pressure wall 60 defines a special cross wall portion indicated at 64 that has the general cross-sectional configurations indicated in FIGS. 2, 3, and 6 whereby the wall portion 64 is formed to define an external concavely rounded indentation or recess 66 in which the helix 50 is disposed. Wall portion 64 within the recess 62, and thus within the pressure cavity chamber portion 62, defines a convexo-planar indentation 67 into which the magnet 42 extends for cooperation with the helix 50. Indentation 67 is defined by spaced apart convexly rounded corner portions 67A on either side of flat or planar portion 67B that magnet 42 faces.

As brought out in FIGS. 2, 4, and 6, the indentations 66 and 67 are elongate lengthwise of the helix 50 and extend in substantial parallelism longitudinally of the axis 51 of rotation of the helix. The indentations 66 and 67 shape the pressure wall portion to define an imperforate segment 70 of film proportions or dimensions which acts as a magnetic flux passing "window" through which the magnetic flux of the magnet 42 acts in controlling the position of the helix 50.

As clearly shown in the drawings, the pressure wall segment 70 is fully integral with the pressure wall 60 about the segment 70. Pressure wall 60 adjacent the base of segment 70 merges integrally with the recessed ledge or shelf 71 that is defined by the housing member 14 to form the operating space 73 in which the helix 50 and associated parts are to be disposed. Indentation 66 is preferably shaped such that it encompasses no more than about one-half the circumference of the helix 50.

The back plate 24 is formed with a pair of vent openings 27A that are respectively aligned with correspondingly located vent openings 29A of housing member 14, which vent through the respective housing member apertures 77 the space 79 enclosed by cover 16 in which the helix 50 (or 50A) operates. Thus, helix 50 (or 50A) operates under pressure conditions ambient to the exterior of gauge 10, rather than subject to any pressures to which gauge 10 may be connected for differential pressure measurement purposes.

Further in accordance with the invention, the magnet 42 is of parallelepiped configuration defining oppositely facing pole faces 72 and 74 (see FIG. 8) that are planar in configuration; magnet 42 is disposed to have the planes of pole faces 72 and 74 disposed parallel to the axis 51 of pivotal movement of the helix 50. The magnet 42 is magnetized to define a magnetic axis 76 which extends perpendicular to the respective pole faces 72 and 74 and through which the magnet magnetic lines of force are oriented. The magnet 42 is mounted so as to dispose its magnetic axis 76 in substantial right angled intersecting relation to the helix pivotal axis 51. The magnet pole face 72 that faces the helix may be either a south pole or a north pole of the magnet, in which case the opposing pole face 74 is of opposite polarity.

Of course, the materials from which the housing member 14, base plate 24, and bezel 282 are formed are of the non-magnetic type, such as aluminum or brass or alloys of same that are non-magnetic. Bracket 44 is conveniently formed from aluminum.

The helix 50 as shown in FIG. 4 is formed to define a single or mono-helical edge 80; in the form of FIG. 4, the helix 50 generally comprises a cylindrical spindle portion 82 having a single spirally contoured flange or lobe 84 that defines the helical edge 80. Helix 50 is formed from a suitable magnetic material, such as steel. However, the helix may also be of the familiar double lobed type, as illustrated for helix 50A of FIG. 3B, and thus defines a pair of helical edges 80.

In accordance with the invention, the helix 50 or 50A and magnet 42 are disposed so that edges 80 of the helix employed are spaced approximately 0.060 inch from the pole face 72, and the pressure wall segment 70 disposed therebetween has a minimum thickness in the range of from approximately 0.030 inch to approximately 0.040 inch. The magnet pole face 72 is thus disposed within indentation 67 and in close conforming relation to pressure wall planar portion 67B, the latter having a width dimension that somewhat exceeds the corresponding width dimension of the magnet 42 (as viewed in FIGS. 1–3B).

As disclosed in U.S. Pat. Nos. 4,011,759 and 4,030,365, the helix flange 84 of helix 50 is a 360 degree turn to make the helix mass balanced. The magnetic lines of flux emanating from the magnet face 72 are concentrated on the flange 84 and by reason of its close and balanced disposition relative to the pole face, and because there is no second flange to detract from the magnetic attraction involved, the magnetic coupling of the helix to the magnet is singularly effective. The helix 50A is operatively associated with the magnet pole face 72 with the orientation suggested in U.S. Pat. Nos. 3,645,140 and 3,862,416.

The zero adjust device 53 comprises bracket member 107 secured to wishbone frame 52 (see FIG. 4) and threadedly receiving adjusting screw 109 that is supported by support member 111 having a foot 113 engaging the housing shelf 71 in substantial alignment with the axis 51 of helix 50, as disclosed in U.S. Pat. No. 4,030,365.

In operation, where differential pressure gauge operation is desired, the high and low pressure connections of the gauge are suitably connected to sources of high and low pressures (utilizing known technology for this purpose) which apply differential pressures in the bourdon tube 35 and the pressure cavity 32 with the result that tube 35 deflects under the pressure differentials between that within the tube and that exteriorly of the tube within cavity 32, whereby the tube end 36A moves proportionately in an arcuate manner to shift magnet 42 substantially linearly along the helix axis, whereby a corresponding pivotal action of the helix is achieved through the magnetic coupling relation the magnet 42 has with the helix 50 (or 50A).

In this connection, the tube 35 and its arm 40 are oriented relative to helix 50 (or 50A) and housing 12 such that the helix axis 51 and the magnetic axis 76 are in coplanar relation with a plane in which support arm 40 lies and magnetic axis 76 is disposed to intersect helix axis 51 (see FIGS. 1 and 2). The tube support arm 40 is directed to roughly be normally disposed relative to helix axis 51 (see FIG. 4). The bourdon tube 35 in deflecting under differential pressures goes through a relatively small arc, for instance, less than ten degrees, to give full scale pointer arm indication across the length of indicia 21 of dial plate 20. Thus, the magnetic axis 76 of magnet 42 remains oriented at or near normal positioning relative to helix axis 51 for substantially linear movement of magnet in parallelism to helix axis 51. Further, the minimal deflection of tube 35 that is needed to provide full scale deflection insures minimal wearing of tube 35 and a corresponding long useful life of gauge 10.

As the magnetic flux tends to keep the helix flanges 84 in the closely spaced relation to the magnetic pole face 72 that is indicated in FIGS. 3, 4 and 8, movement of the magnet 42 longitudinally of the helix pivotal axis will result in pivotal movement of the helix 50 or 50A to thereby change the position of the helix indicating arm relative to the dial plate 20, due to the magnetic coupling involved.

The pressures in the pressure cavity 32 are fully shielded from the helix 50 or 50A, while at the same time the proportioning of the pressure wall portion 70 accommodates transmission of the magnet lines of flux therethrough for the desired magnetic coupling effect on the helix. The film dimensions of the pressure wall portion 70 are possible due to the configurations of indentations 66 and 67 and the unitary connection that wall segment 70 has with the basic pressure wall 60. The shaping of the parts involved results in the wall portion 70 being placed in bending under the pressures within the chamber 34, thereby avoiding undue stress on the magnetic window of the pressure wall. As indicated, the helix 50 (or 50A) operates under atmospheric pressure conditions ambient to the exterior of gauge 10, for maximum freedom from friction and sensitivity.

Where the housing member 14 and base plate 24 are formed from aluminum, the housing member 14 accommodates total pressures as high as 1000 psi. By utilizing high strength alloys such as manganese bronze or aluminum bronze higher total pressure may be obtained.

Where the devise is to be operated as a single pressure gauge, the pressure source is connected to the bourdon tube 35, with the pressure cavity 32 being left open or otherwise vented to the atmosphere. The tube 35 will then deflect under the pressure therein in the same manner as already indicated to provide single pressure gauge indication at the dial plate 20, measured against atmosphere pressure.

SPECIFIC DESCRIPTION

The housing member 14 and the back plate 24 are formed in any suitable manner to the shapes indicated in the drawings, suitable casting procedures being employed in a preferred embodiment. These components may be formed with suitable reinforcing webbing, and the like for providing the desired structural integrity, such as that illustrated.

In the specific gauge form shown, the high and low pressure connections of the gauge are made to the base plate 24, the base plate being formed, in the form shown, with a pair of oppositely disposed threaded sockets 100 (see FIGS. 4 and 7) each communicating with a low pressure passageway 102 which communicate with the pressure cavity 32 through the respective ports 104 and a common central port 105. Similar threaded sockets 106 communicate directly with the respective high pressure passageways 108 that respectively communicate with a correspondingly located passageways 108A in housing member 14. For each passageway 108A housing member 14 is formed with a cross passage 108B leading to pressure cavity 32, with the respective passages 108B being equipped with a suitable fitting 108C with which the respective conduits 39 and 39A are connected for purposes of connecting the high pressure source to bourdon tube assembly 34. Conduits 39 and 39A comprise lengths of flexible metal tubing 110 that are suitably fixed at their respective ends 112 to the respective fittings 108C in leak free relation thereto, and have their other ends 114 suitably fixed to fitting 116 carried by mounting plate 37 for leak free connection to tube 35.

In this connection passageways 108A at their ends that align with passageways 108 are centrally located in the respective recesses 115, each of which receives an O-ring (not shown) for sealing off these fluid communication passages between back plate 24 and housing member 14.

The sockets 100 and 106 and the passageways they communicate through to the pressure cavity 32 and bourdon tube assembly 35 are provided in pairs for purging purposes on setting up of the instrument, as suggested, for instance, by the arrangement of the gauge of Phillips and Troyer U.S. Pat. No. 4,030,365. When the instrument has been purged by connecting the sockets 100 and 106 on the appropriate side of the instrument (top for air or gas, bottom for liquids) to the respective low and high pressure sources, the sockets 100 and 106 of the other set of such sockets on the other side of the instrument may be suitably sealed, using tapered threaded plugs and sealing compound (not shown but conventional) as needed for this purpose, though, of course, both sets of sockets could be connected to the respective pressure sources after purging.

For single pressure gauge use, the pressure source is connected to the socket 106 at the appropriate side of the instrument (top for air or gas, bottom for liquids) and the socket 100 at that side of the instrument vented to atmosphere; after purging, the sockets 100 and 106 on the other side of the instrument are normally suitably sealed as described immediately above. The venting may be by way of leaving the socket 100 involved open, but it is preferred that this socket 100 have connected to same a conduit that vents outdoors, or to some other safe area, thereby providing a safety or explosion proof feature in the unlikely event of a rupture in the bourdon tube 35 that effects safe disposition of the gas or liquid involved. Of course, both sockets 106 may be connected to the pressure source and both sockets 100 vented as indicated.

The helix support frame 52 preferably is of the type disclosed in said U.S. Pat. No. 3,862,416, and preferably journals the helix 50 between fixed bearing 230 and adjustable bearing 232. The frame leg portions 54 are secured to housing member pedestals 229 (see FIG. 5) by suitable screws 233. The dial plate 20 is secured to frame by suitable fasteners (not shown); pointer stops 235 (see FIG. 1) may be used as desired. Support 52 is arranged to, when secured in its operating position, provide a spring biasing action on the zero adjust support member 111, biasing it against the housing shelf structure 71.

Operably associated with support frame 52 is the zero adjust device 53 that is fully disclosed in said U.S. Pat. No. 4,030,365, to which reference may be had for a specific description of same. As indicated in FIG. 4, the bracket member 107 comprises an elongate mounting portion 240 having its opposite end portions (not shown) secured to the frame 52 by appropriate screws 244. Integral with elongate portion 240 is nut portion 246 that is disposed at right angles to the elongate portion 240 and threadedly receives screw member 109 in its threaded opening 248.

The zero adjust support member 111 has a body portion 250 that is generally planar in configuration and is centrally apertured to define a quadrilaterally contoured window 252 through which the nut portion 246 of bracket member 107 extends for application to screw member 109.

The support member 111 is shaped to define a pair of upper and lower tabs 254 and 256 that are disposed at right angles to the body portion 250, and are thus in parallelism. Screw member 109 has the lower end 258 of its threaded portion 260 journalled in the journalling aperture 262 of tab portion 256, while the upper end 264 of threaded portion 260 is nonthreadedly received through guide aperture 266 formed in the tab 254.

The foot 113 of support member 111 is integral therewith by way of an appropriately shaped connecting portion 270. As indicated, it is preferable that the foot 113 be disposed adjacent to the location of the axis 51 of the helix 50 (or 50A), and in engagement with the housing shelf structure 71.

The bourdon tube 35 itself is formed from a material suitable for that purpose, such as Beryllium copper tubing; tubing formed from other materials such as Inconel, phosphor bronze, and stainless steel are also satisfactory. In one practical embodiment, the tube 35 is formed from Beryllium copper tubing of ⅛th inch O.D., and 0.005 inch wall thickness, which when incorporated in a gauge 10 in accordance with the invention, provides a differential gauge easily handling 30 psi. pressure differential. Forming the tube 35 with the same material in tube O.D. size with a 0.009 wall thickness at a range as indicated, will provide a gauge readily handling 200 psi. pressure differentials. Thus, the wall thickness of the tube 35 can be varied as desired for providing gauge differential handling pressures therebetween.

As indicated in the drawings, the tube 35 thus comprises side wall 120 which prior to processing is circular in transverse cross-sectional configuration, but in processing the tubing to make a bourdon tube 35, in accordance with the invention, the tubing is first flattened so that the major axis of same is roughly four to five times its minor axis. The tubing is then coiled in a helical mounted manner about a central axis 122 to a coil size suitable for practicing the invention which will have an outer diameter in the range of from about ½ inch to about ⅝ths inch. Employing the aforesuggested Beryllium copper tubing, it has been found that tubes 35 having approximately 2½ coils give the desired output in terms of deflection under differential pressures achieved by connecting the tube bore 124 to the high pressure source and the housing cavity 32 to the low pressure source, which is an angular deflection in the range of from about 5 degrees to about 7 degrees at the output end 36A of the tube 35, that will give full scale deflection of the indicator 22 across the scale indicia 21 of the scale plate 20 by way of magnet 42 and helix 50 (or 50A).

However, wall thickness of the tube 35, the flattened dimensions of same, the diameter of the resulting tube coil, and the number of turns of the coil can all be varied to produce a desired rotational output for a given applied maximum differential pressure.

Tube 35 has its end 36 anchored to mounting plate 37 in suitable leak free communicating relation with fitting 116 whereby conduits 39 and 39A have free communication with the fixed end 36 of tube 35. Tube 35 at its free end 36A is suitably sealed closed and has affixed thereto the mounted end 43A of the magnet support arm 40, these parts being secured together in any suitable manner, as by soldering or the like.

The support arm 40 comprises bar 126 that is of uniform quadrilateral transverse cross-sectional configuration along its length, and which slidably receives at its end 43 the magnet mounting bracket 44, in friction fit relation thereto, that in turn mounts the magnet 42.

The mounting bracket 44 in its specific form shown in FIGS. 8 and 9 comprises a magnet retainer section 130 and a support arm mounting section 132, both formed in an integral manner from a strip of aluminum or the like fabricated to have the configuration best indicated in FIGS. 8 and 9. Thus, the bracket section 130 is formed with upstanding side walls 134 and 136 and web 138 between which the magnet 42 is seated, with the side walls 134 and 136 having upper flange portions 140 and 142 that seat against the top of the magnet 42 to firmly hold it in place on bracket 44. Magnet 42 may be suitably bonded in place or force fitted to the position indicated in FIGS. 8 and 9.

The section 132 of the bracket 44 comprises a web portion 144 and depending side walls 146 and 148 that are proportioned to define end flanges 152 and 153 (see FIG. 3A) that are turned to oppose each other to define a socket 154 that is proportioned to frictionally receive the free end 43 of the support arm 40 in the manner indicated in FIGS. 8 and 9.

The web portions 138 and 144 of the bracket 44 are integrally connected by bridge portion 156 that may be provided with suitable reinforcing rib 158. The bracket 44 at its web portion 144 is suitably relieved for flexure purposes by apertures 160.

The magnet 42 is preferably formed from a suitable high energy product material, such as the Samarium Cobalt product (made using powdered metal formulation techniques) sold under the trademark HICOREX by Hitachi Magnetics Corp. of Edmore, Michigan. An energy product in the range of from about 14 to about 18 million gauss oersteds is preferred.

The over pressure stop 45 comprises screw member 164 threadedly applied to the mounting plate 37 in alignment with support arm 40 so as to dispose stop forming end 166 of screw 164 in alignment with and adjacent to the end 43A of support arm 40. Screw member 164 in the form illustrated is threadedly received in suitable nut member 168 affixed to the mounting plate 37 and includes the usual slotted head 170 for adjusting purposes.

With the bourdon tube assembly components assembled together as indicated, the mounting plate 37 is applied to the respective housing member lands 172 and 174 employing suitable mounting screws 38 which cooperate with suitable washers 176. The mounting plate 37 is formed with the respective slots 178 through which the shanks of the screws 38 pass for threaded connection to the housing member 14 to permit adjustment of the bourdon tube assembly 34 as a whole to calibrate the gauge 10. Lands 172 and 174 are disposed on either side of pressure wall recess 62.

Assuming that the housing member has the helix 50 (or 50A) and associated parts applied thereto, and prior to the application to the housing member of the back plate 24, the gauge may be calibrated by moving the bourdon tube assembly 34 as a whole either closer to or further from the helix, while screws 38 remain loose. This thus permits shifting movement of the bourdon tube transversely of its central axis 122, which as indicated by the drawings, is disposed to be substantially perpendicular to the common plane of the helix axis 51 and the magnetic axis 76.

Where the bourdon tube assembly is shifted toward the helix, the indicator arm 22 travel will be reduced for a given pressure differential input to the bourdon tube and arc output of same at its end 36A.

Conversely, where the assembly 34 is moved away from the helix, the travel of the indicator 22 will be increased for a given differential input to the bourdon tube and arc output at its end 36A.

The slidable mounting of the bracket 44 on the end 43 of the support arm 40 permits adjustment of the bracket relative to the arm 40 to dispose the pole face 72 of the magnet at its optimum distance from the helix, after the bourdon tube assembly has been adjusted to its desired location.

The cover 16 comprises a cover member 280 formed from a suitable transparent material and held in place by an annular clamp member or bezel 282 threadedly secured to the housing member 14 where indicated at 28. The flange portion 284 of the bezel 282 engages the flange 286 of the cover member for this purpose, to hold same against a suitable O-ring seal 288 that in turn bears against sealing surface 290 defined by the housing member 14.

In the form shown, the zero adjust screw member 109 has its threaded portion 260 internally hex socketed at its uper end 264 to receive hex shaped end portion 291 of spindle 292, the latter extending into cylindrical bore 294 formed in the cover member 280. The spindle 292 is formed with a head portion 296 that is suitably grooved as at 298 to receive suitable O-ring seal 300 that is in sealing relation with the bore 294; the head 296 is appropriately slotted as at 302 for application thereto of a suitable turning tool to set the indicator or pointer 22 on the zero datum 23 by changing the position of the helix relative to the magnet by way of rotation of screw 109 and the resulting movement of bracket member 107 and the helix longitudinally of its axis.

The housing member 14 is provided with an internally threaded opening 310 of frusto-conical configuration providing access to pressure cavity 32. The access opening 310 is closed by suitable threaded plug 312 suitably arranged for sealing off the housing at the aperture 310. Of course, when only one set of the threaded openings 100 and 106 are to be connected to the sources of fluid under pressure, the other set are suitably sealed by using suitable sealing plugs.

It will therefore be seen that the pressure gauge of this invention provides a gauge adapted for both differential and single pressure gauge use, that combines the high differential pressure capabilities and long life characteristics of the bourdon tube with the highly sensitive and accurate helix type motion transmitting indicator whereby maximized differential pressures are accommodated for a minimal deflection of the sensor while yet providing for full range indication capability across the gauge scale.

The pressure differential sensing and helix movement inducing device is completely sealed off from the helix, permitting the helix and indicator it carries to operate in pressures ambient to the gauge, when it is operated as a differential pressure gauge.

The invention avoids the need of gearing and consequent gear wear, play, and backlash, the sensing device resists wear or mal function due to pressure pulses and vibration, and by appropriately dimensioning, coiling, and positioning, the bourdon tube relative to the helix, gauges capable of handling differential input pressures of 200 psi or more are made commercially available, as compared to conventional diaphragm sensing devices and gauges that have limits in the range of 20 to 25 psi differential pressures.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a gauge that includes linear to rotary motion transforming means including a helix journalled for rotation about its longitudinal axis, and a magnet for producing rotational movement of said helix about its said axis in response to movement of the magnet alongside and lengthwise of said helix axis, the improvement including:

a bourdon tube spaced from said helix, one end of said tube being sealed and mounting a support arm on which the magnet is mounted, means for mounting said tube at the other end of same, with the other end of said tube being sealed and including means for connecting said tube other end to a fluid pressure source, said mounting means including means for adjusting said tube toward and away from said helix axis.

2. In a gauge that includes linear to rotary motion transforming means including a helix journaled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, with the magnet liner movement path and the helix axis being in coplanar relation, the improvement including:

a bourdon tube helically coiled about a rectilinear axis and disposed in said housing spaced from said helix with said magnet disposed between the helix and said tube and said tube axis extending crosswise of said plane, one end of said tube being sealed and mounting a support arm lying in said plane on which the magnet is mounted for movement in said plane, means for mounting said tube in fixed relation to the housing at the other end of same, with the other end of said tube being sealed and including means for connecting said tube other end to a fluid pressure source exterior of the housing, said mounting tube means including means for adjusting said tube toward and away from said helix axis.

3. The improvement set forth in claim 2 wherein:

the magnet is mounted on said tube support arm for adjustment longitudinally of said support arm for restoring the magnet to a predetermined spacing from the helix when said tube is adjusted relative to the helix axis.

4. The improvement set forth in claim 3 wherein:

the magnet has a planar pole face, said magnet pole face being disposed to face the helix, with the plane of said pole face substantially paralleling the helix axis and extending substantially normally of said first mentioned plane with the magnet defining a magnetic axis extending perpendicular to said pole face.

5. The improvement set forth in claim 2 including:

an over pressure stop carried by the housing and disposed adjacent said support arm and in substantial alignment with said plane.

6. The improvement set forth in claim 5 wherein:

said mounting means comprises a cross member extending normally of said plane and releasably secured to said housing for effecting said adjustment of said tube, said stop being mounted on said cross member.

7. The improvement set forth in claim 4 wherein:

said helix is formed to define a spindle portion having one or more helically contoured flanges projecting laterally thereof in spiralled relation thereto, said helix flanges and said magnet pole face being in close adjacency, said housing being formed to define a pressure wall structure of non-magnetic material separating the magnet from said helix and forming a differential pressure chamber in which said tube and said magnet are disposed, said wall structure having a portion disposed between said helix and said magnet that is elongate longitudinally of the helix axis and defines a nonmagnetic medium that separates said helix from said magnet, said wall portion defining opposed surfaces extending longitudinally of the helix axis respectively facing the magnet and the helix, said wall portion being integral with said wall structure about its margin, and between said surfaces of said wall portion, said wall portion being of film dimensions for close positioning of said magnet pole face to said helix flanges and for passage of magnetic flux of the magnet therethrough for magnetic coupling relation with the helix for controlling with said magnet the position of the helix relative to the housing, said wall structure on either side of said wall portion being of relatively thick dimension laterally thereof for bracing said wall portion against the action of pressures in said chamber.

8. The improvement set forth in claim 7 wherein:

said helix flange and said pole face have a spacing on the order of 0.060 inch.

9. The improvement set forth in claim 7 wherein:
said magnet is of the high energy product type,
said magnet being disposed relative to said helix such that the magnetic axis of said magnet substantially intersects said helix axis and is normal relative thereto.

10. The improvement set forth in claim 7 wherein:
said helix is cantilever mounted for zero adjust movement longitudinally of its axis relative to said wall structure.

11. In a pressure gauge that includes linear to rotary motion transforming means including a helix journaled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, a zero datum adjacent to which the indicator is disposed, with the housing defining a pressure chamber in which the magnet is mounted, and including sensing means mounted in said pressure chamber for shifting said magnet in a path extending lengthwise of said helix in response to differential pressure changes in said chamber, with the magnet path and the helix axis being in coplanar relation,
the improvement including:
a bourdon tube helically coiled about a rectilinear axis and disposed in said housing pressure chamber spaced from said helix with said magnet disposed between the helix and said tube and said tube axis extending crosswise of said plane of said magnet path and helix axis,
one end of said tube being sealed and mounting a support arm lying in said plane on which the magnet is mounted for movement in said plane,
means for mounting said tube in fixed relation to the housing at the other end of same,
with the other end of said tube being sealed and including means for connecting said tube other end to a first fluid pressure source exterior of the housing,
said tube comprising said sensing means,
and means for connecting the housing pressure chamber to a second fluid pressure source exterior of the housing,
said mounting means including means for adjusting said tube toward and away from said helix axis.

12. The improvement set forth in claim 11 wherein:
said tube mounting means comprises a cross member extending normally of said plane,
said tube being anchored to said cross member adjacent said other end thereof to suspend said tube, said support arm, and said magnet within the housing pressure chamber,
and means for shiftably securing said cross member to said housing for effecting said adjusting of said tube by effecting movement of said support arm and magnet in said plane toward and away from said helix axis.

13. The improvement set forth in claim 12 wherein: the magnet is mounted on said tube support arm for adjustment longitudinally of said support arm for restoring the magnet to a predetermined spacing from the helix when said tube is adjusted relative to the helix axis.

14. The improvement set forth in claim 12 including:
an over pressure stop carried by said cross member and disposed adjacent said support arm and in substantial alignment with said plane for limiting over pressure movement of said support arm in response to over pressures experienced in said tube,
said tube, said support arm said magnet, said cross member, and said over pressure stop comprising a bourdon tube subassembly adjustable relative to said helix axis as a unit on said adjustably shifting of said tube.

15. The improvement set forth in claim 11 wherein:
the magnet has a planar pole face,
said magnet pole face being disposed to face the helix,
with the plane of said pole face substantially paralleling the helix axis and extending substantially normally of said first mentioned plane,
with the magnet defining a magnetic axis extending perpendicular to said pole face,
said magnet defining a magnetic axis,
said magnet being disposed relative to said helix such that said magnetic axis substantially lies in said first mentioned plane and intersects said axis in substantially normal relation thereto.

16. The improvement set forth in claim 15 wherein:
said helix being formed to define a spindle portion having one or more helically contoured flanges projecting laterally thereof in spiralled relation thereto,
said helix flanges and said magnet pole face being in close adjacency,
said housing being formed to define a pressure wall structure of non-magnetic material separating said pressure chamber from said helix and forming a pressure chamber portion in which said tube, said support arm and said magnet are disposed,
said wall structure having a portion disposed between said helix and said magnet that is elongate longitudinally of the helix axis and defines a non-magnetic medium that separates said helix from said magnet,
said wall portion defining opposed surfaces extending longitudinally of the helix axis respectively facing the magnet and the helix,
said wall portion being integral with said wall structure about its margin, and between said wall portion surfaces, said wall portion being of film dimensions,
said wall structure on either side of said wall portion being of relatively thick dimension laterally thereof for bracing said wall portion against the action of pressures in said chamber.

17. The improvement set forth in claim 12 wherein:
said helix is cantilever mounted for zero adjusting movement longitudinally of its axis relative to said wall structure,
and means for effecting said adjustment movement of said helix from exteriorly of the housing to set the indicator on the zero datum.

18. The improvement set forth in claim 16 wherein:
said cross member is disposed in bridging relation to said pressure chamber portion.

19. In a gauge that includes linear to rotary motion transforming means including a helix journalled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, a zero datum adjacent to which the indicator is disposed, with the housing defining a pressure chamber in which the magnet is mounted, and including sensing means mounted in said pressure chamber for shifting said magnet in a path extending lengthwise of said helix in response to differential pressure changes in said chamber, with the magnet path and the helix axis being in coplanar relation, the improvement including:

a bourdon tube helically coiled about a rectilinear axis and disposed in said housing pressure chamber spaced from said helix with said magnet disposed between the helix and said tube and said tube axis extending crosswise of said plane of said magnet path and helix axis, one end of said tube being sealed and mounting a support arm lying in said plane on which the magnet is mounted for movement in said plane, means for mounting said tube in fixed relation to the housing at the other end of same, with the other end of said tube being sealed and including means for connecting said tube other end to a first fluid pressure source exterior of the housing, said tube comprising said sensing means, and means for connecting the housing pressure chamber to a second fluid pressure source exterior of the housing, said second fluid pressure source being other than atmosphere.

20. In a gauge that includes linear to rotary motion transforming means including a helix journalled for rotation about its longitudinal axis, with the helix having an indicator connected thereto, a magnet for producing rotational movement of said helix about its said axis in response to linear movement of the magnet alongside and lengthwise of said helix axis, and a housing for the helix and magnet, a zero datum adjacent to which the indicator is disposed, with the housing defining a pressure chamber in which the magnet is mounted, and including sensing means mounted in said pressure chamber for shifting said magnet in a path extending lengthwise of said helix in response to differential pressure changes in said chamber, with the magnet path and the helix axis being in coplanar relation, the improvement including:

a bourdon tube helically coiled about a rectilinear axis and disposed in said housing pressure chamber spaced from said helix with said magnet disposed between the helix and said tube and said tube axis extending crosswise of said plane of said magnet path and helix axis, one end of said tube being sealed and mounting a support arm lying in said plane on which the magnet is mounted for movement in said plane, means for mounting said tube in fixed relation to the housing at the other end of same, with the other end of said tube being sealed and including means for connecting said tube other end to a first fluid pressure source exterior of the housing, said tube comprising said sensing means, and means for connecting the housing pressure chamber to a second fluid pressure source exterior of the housing, said means for connecting the housing pressure chamber to the second fluid pressure source comprising means for venting same to atmosphere.

* * * * *